US012656195B2

(12) United States Patent
Lindsey

(10) Patent No.: US 12,656,195 B2
(45) Date of Patent: Jun. 16, 2026

(54) DISTRIBUTED FIBER-OPTIC SENSING SYSTEMS, DEVICES, AND METHODS

(71) Applicant: FIBER SENSE LIMITED, Mosman (AU)

(72) Inventor: Nathaniel J. Lindsey, Oakland, CA (US)

(73) Assignee: Fiber Sense Limited, Mosman (AU)

( * ) Notice: Subject to any disclaimer, the term of this patent is extended or adjusted under 35 U.S.C. 154(b) by 251 days.

(21) Appl. No.: 18/277,568

(22) PCT Filed: Feb. 18, 2022

(86) PCT No.: PCT/US2022/017026
§ 371 (c)(1),
(2) Date: Aug. 16, 2023

(87) PCT Pub. No.: WO2022/178281
PCT Pub. Date: Aug. 25, 2022

(65) Prior Publication Data
US 2024/0302229 A1     Sep. 12, 2024

Related U.S. Application Data

(60) Provisional application No. 63/151,332, filed on Feb. 19, 2021.

(51) Int. Cl.
G01L 1/24 (2006.01)
G01D 5/353 (2006.01)

(52) U.S. Cl.
CPC .......... G01L 1/242 (2013.01); G01D 5/35361 (2013.01)

(58) Field of Classification Search
CPC ............... G01L 1/242; G01D 5/35358; G01D 5/35361; G01D 5/35364
See application file for complete search history.

(56) References Cited

U.S. PATENT DOCUMENTS 5,451,772 A     9/1995  Narendran
5,617,086 A *   4/1997  Klashinsky .............. G08G 1/08
                                                     340/936
(Continued)

FOREIGN PATENT DOCUMENTS

CN        107591002 B      6/2020
JP        2003344148 A    12/2003
(Continued)

OTHER PUBLICATIONS

Al-Tarawneh, Mu'ath, et al. "Weigh-In-Motion system in flexible pavements using fiber Bragg grating sensors part A: Concept." IEEE Transactions on Intelligent Transportation Systems 21.12 (2019): 5136-5147.*

(Continued)

*Primary Examiner* — Herbert K Roberts
(74) *Attorney, Agent, or Firm* — Morgan, Lewis & Bockius LLP

(57) ABSTRACT

A distributed fiber optic sensing (DFOS) system and method record optical data in one or more optical fibers, calculate physical parameters from the recorded optical data, and compute locations of vehicles passing above or beside the one or more optical fibers based on the DFOS data. A method of determining a force exerted by an object onto a surface under the object using at least one optical fiber located below or adjacent to the surface includes measuring DFOS data arising from strain in the at least one optical fiber responsive to the force, determining at least one relationship between the measured DFOS data and the force and processing the measured DFOS data and the at least one relationship to determine the force.

19 Claims, 5 Drawing Sheets

(56) References Cited

U.S. PATENT DOCUMENTS

| | | | |
|---|---|---|---|
| 7,024,064 B2 | 4/2006 | Hill et al. | |
| 10,861,328 B2 | 12/2020 | Goncalves | |
| 2017/0205253 A1 | 7/2017 | Handerek | |
| 2018/0094952 A1 | 4/2018 | Handerek | |
| 2018/0342156 A1* | 11/2018 | Martin | ................... G08G 1/052 |
| 2019/0137305 A1 | 5/2019 | Karabacak et al. | |
| 2019/0227184 A1 | 7/2019 | Cuny et al. | |
| 2019/0302291 A1 | 10/2019 | Lolla et al. | |

FOREIGN PATENT DOCUMENTS

| | | | |
|---|---|---|---|
| JP | 2009189655 A | 8/2009 | |
| JP | 2010515094 A | 5/2010 | |
| WO | WO/2018/045433 A1 | 3/2018 | |
| WO | WO2020/116030 A1 | 6/2020 | |
| WO | WO2020/257167 A1 | 12/2020 | |
| WO | WO-2021152648 A1 * | 8/2021 | ............ G06N 3/045 |

OTHER PUBLICATIONS

Heimann, Sebastian, et al. "A Python framework for efficient use of pre-computed Green's functions in seismological and other physical forward and inverse source problems." Solid earth 10.6 (2019): 1921-1935.*

Fiber Sense Limited, International Search Report and Written Opinion, PCT/US2022/17026, Aug. 1, 2022, 18 pgs.

Notice of Reasons for Refusal, CN2021-526397, Nov. 7, 2023, 11 pgs.

Fiber Sense Limited, Extended European Search Report, EP22757018.1, May 13, 2025, 16 pgs.

Heo, Jin-Seok et al., "Tactile Sensors using the Distributed Optical Fiber Sensors", 3rd International Conference on Sensing Technology, Nov. 30-Dec. 3, 2008, Tainan, Taiwan, 8 pgs.

Notice of Reasons for Rejection, JP2023-550266, Feb. 16, 2026, 7 pgs.

* cited by examiner

DISTRIBUTED FIBER-OPTIC SENSING SYSTEMS, DEVICES, AND METHODS

CROSS-REFERENCE TO RELATED APPLICATIONS

This application is a United States National Stage Application filed under 35 U.S.C. § 371 of PCT Patent Application Serial No. PCT/US2022/017026, filed on Feb. 18, 2022, titled "Distributed Fiber-Optic Sensing Systems, Devices, And Methods," which claims the benefit of and priority to U.S. Provisional Application No. 63/151,332 filed Feb. 19, 2021, each of these two applications is incorporated herein by reference in its entirety.

BACKGROUND

Discrete vehicle detection/analysis/tracking is beneficial for future digital city applications, including autonomous vehicle navigation and intelligent transportation and infrastructure, among others. Discrete in the present context means representing traffic as a set of individual vehicle objects whose location and property information can be disaggregated and tracked through space and time in real-time (e.g., >1-point-per-second), with high accuracy (e.g., <1% false positive rate), high resolution (e.g., <10 meters) over a large area (e.g., more than one city block) and along an arbitrary path in a wider grid of possible paths. Vehicle location information includes 3-D position with respect to a road surface. Vehicle property information includes the vehicle's footprint (area), mass, mass distribution, and number of axles. This type of a vehicle information system ("VIS") has the special capacity to query vehicle information with a granularity that enables, for example, deduction of a particular vehicle's history, measurement of a vehicle's behavior, and reconstructing past traffic events or forecasting of traffic trends with a novel level of detail.

There are several barriers to development of a discrete vehicle detection/analysis/tracking system, including (1) a physical line-of-sight issue for remote-sensing/imagery-based approaches posed by buildings, tunnels, bridges, trees, highway overpasses which prevent gapless street-level information capture, (2) a technical issue for single-point sensor attempting to analyze information across a large network and still provide real-time analysis, (3) the susceptibility for undesired interception of transmitted signals for example in vehicle-to-vehicle communication, (4) the sensitivity to and in some cases legal prohibition of collecting personal identity information (face, ethnicity, gender, license plate) for any camera-based or mobile phone-based approach, and (5) the level of resources required if discrete sensors were to be used to achieve gapless coverage over a practical sensing area.

Several advancements in the field of distributed fiber-optic sensing ("DFOS") have taken place over the past decade, which together resulted in the ability to probe the fiber-optics already buried along linear infrastructure that are commonly used for telecommunications as an accurate and quantitative ground motion sensing array for the purpose of a high-definition vehicle information system ("HD-VIS"). Vehicles generate many different types of ground motions which can be detected by DFOS.

SUMMARY

Embodiments of the present disclosure provide methods, systems, and devices that enable detection, analysis, and/or tracking in an area with substantially total cover of a geographic area, such as a city. However, the disclosure is not limited to total cover gapless grids, and other areas of coverage can be defined.

Embodiments of the present disclosure address the problems with existing approaches for an HD-VIS and others. In some embodiments, the disclosure includes systems, devices, and methods for using quantitative DFOS with optical fibers buried along linear infrastructure to estimate vehicle location information, including individual vehicle positions along and across a single or multi-lane road.

In further embodiments, the disclosure includes systems, devices, and methods of using quantitative DFOS with optical fibers buried along linear infrastructure to estimate vehicle property information, including individual vehicle footprint (area), number of axles, relative position of axles, mass, mass distribution, velocity, acceleration, momentum, and/or estimates of occupancy and/or vehicle load.

In further embodiments, the disclosure includes systems, devices, and methods of combining multiple pieces of vehicle location information and/or vehicle property information to deduce or infer vehicle history, behavior, patterns, forecast, or aggregate individual vehicle information to a multi-vehicle level trend.

In further embodiments, the disclosure includes systems, devices, and methods that can apply the above embodiments to any moving object that exerts a force on a surface adjacent to an optical fiber, other than vehicles on a roadway, including pedestrians, trains, trams, lifting cranes, bicycles, and animals.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Some of the figures may have been simplified by the omission of selected features for the purpose of more clearly showing other underlying features. Such omissions of elements in some figures are not necessarily indicative of the presence or absence of particular elements in any of the exemplary embodiments, except as may be explicitly disclosed in the corresponding written description.

DETAILED DESCRIPTION

Figure 1:
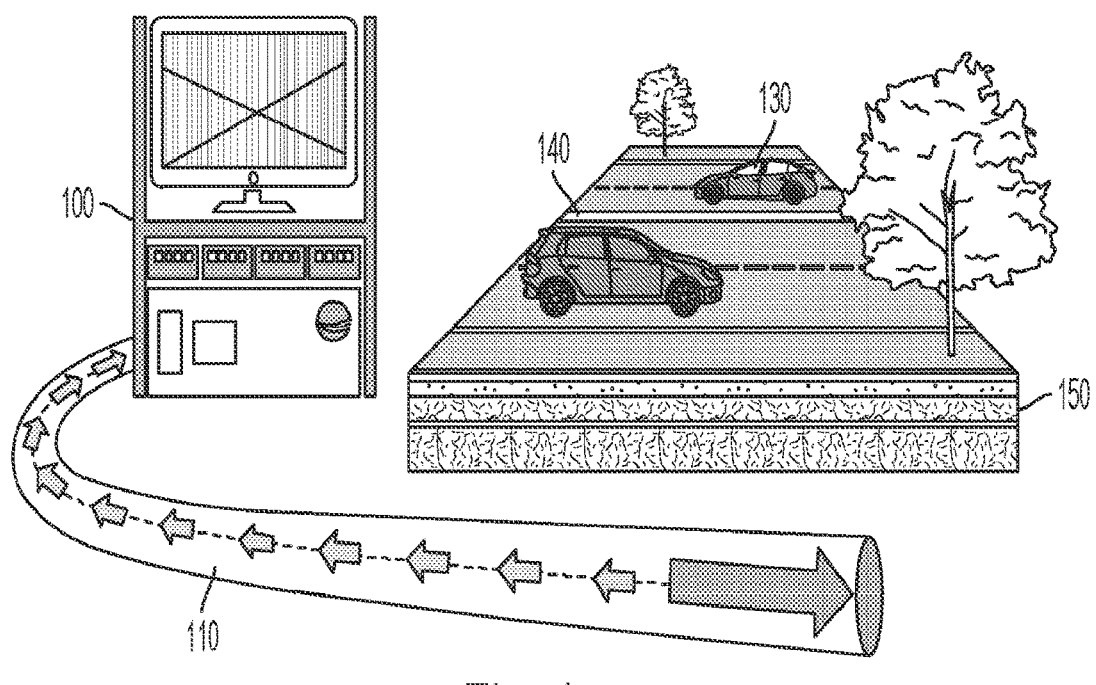
FIG. 1 illustrates an example of a DFOS instrument sending and receiving laser light according to embodiments of the disclosed subject matter.

Referring to FIG. 1, A DFOS instrument 100 shines a light into an optical fiber 150 and records the energy 110 returning as a function of time. The light can be any kind, including a simple pulse, chirped pulse, or continuous wave. In embodiments, the light is laser light. In further embodiments the laser light is in the infrared or near infrared frequency range. The energy returning from the optical fiber sensing path may have been Rayleigh scattered as a result of the optical scattering properties along the length of the optical fiber, or the returning energy may have been caused by some Brilluoin or Raman transitions from the incident wavelength. The returning light can be analyzed optically, digitally, or both. The output of this process is a dataset, referred to here as the DFOS data or DFOS recording, which contains values about the state of the optical fiber for a particular time sample at all sensor positions in the fiber.

As shown in FIG. 1, fiber 150 may be buried under or near a roadway 140. One or more cars 130 drive over the roadway 140, and the presence, location, movement, and other attributes of the cars 130 can be determined by DFOS instrument 100, as described below.

In an embodiment, the DFOS instrument can be an interrogator unit ("IU") such as a unit for distributed acoustic sensing described in WO 2018/045433 A1, which is incorporated by reference in its entirety herein.

In some cases of DFOS there is not a physical fixed length sensor position. In principle, the gauge length is the distance along the optical fiber over which one DFOS value is sensitive. In an embodiment, in one type of pulsed Rayleigh-based DFOS the gauge length may be 10 m and the recorded data could be strain. In this case, the 10 m gauge length is the reference length over which displacements cause the resulting strain. The gauge length can affect many aspects of the measurement including the quality of the measurement, the gain of the measurement, the finest spatial size that can be analyzed without spatial aliasing, and the recorded DFOS data volume. The gauge length can be set in hardware and/or software. If the gauge length is established in software it may be possible to record DFOS data at multiple gauge lengths.

The DFOS measurement is sensitive to the motion/deformation of the optical fiber 150, and hence the motion/deformation of the optical fiber's surroundings. For example, during an earthquake the soil will undergo compression and rarefaction as the seismic waves propagate through the near surface, and this motion will be transferred to the optical fiber 150.

The DFOS measurement can be made wherever a continuous optical fiber exists and can be connected at one end to a DFOS instrument 100. The fiber can be laid in any orientation, or even wrapped around a central cylinder in a helical fashion to introduce more than one component of motion/deformation to each gauge length of the DFOS measurement. Existing optical fiber laid for a different purpose can be utilized for the DFOS measurement. Multiple fibers can be joined in series and used for DFOS with one instrument, or multiple DFOS channels (analyzed with the same or separate DFOS instruments) can be used to record DFOS data within the same vicinity.

The following is a non-limiting example of how DFOS may be used in embodiments of the present disclosure. Two optical fibers (Fiber 1 and Fiber 2) each of length 25 km can be illuminated using independent channels from the same DFOS instrument 100 housed in an urban data center. Fiber 1 can be a standard dark fiber (i.e., a fiber that is not used for digital communication) in a fiber cable bundle embedded horizontally in the street 140 below the center median at a depth of 1.25 m. Fiber 2 can be a lit fiber with its path being located at the right-hand road edge of the same street 140 as Fiber 1. For most of Fiber 1 and Fiber 2 their locations may be very different across the city, but they share this street. Following the fiber selection, connection and calibration process, DFOS data begin to be recorded. A new time sample of the DFOS dataset might be recorded every 0.001 s for all sensors with a gauge length (spatial resolution) of 3 m.

As illustrated in the conceptual workflow in FIG. 2A, various processes (also referred to as methods and described below) can be executed on the DFOS recording. These methods can be executed in real time or pseudo-real time or on recorded data. The methods include an optional detection step, followed by locating, characterizing, and tracking vehicles and vehicle-associated locations and properties through time and space.

Figure 2A:
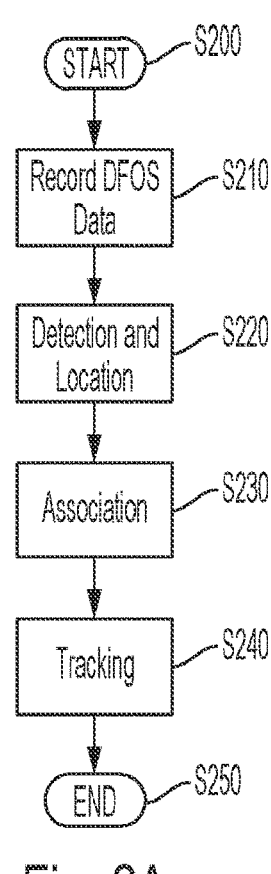
FIG. 2A illustrates an example of a process flow according to embodiments of the disclosed subject matter.

Referring to FIG. 2A, the illustrated flowchart illustrates the overall process for detecting and tracking vehicles using DFOS according to various embodiments of the present disclosure. The process begins at S200 and continues to S210, where DFOS data is recorded. Further details of S210 are illustrated in FIG. 2B and discussed below.

Figures 2B, 2C, 2D:
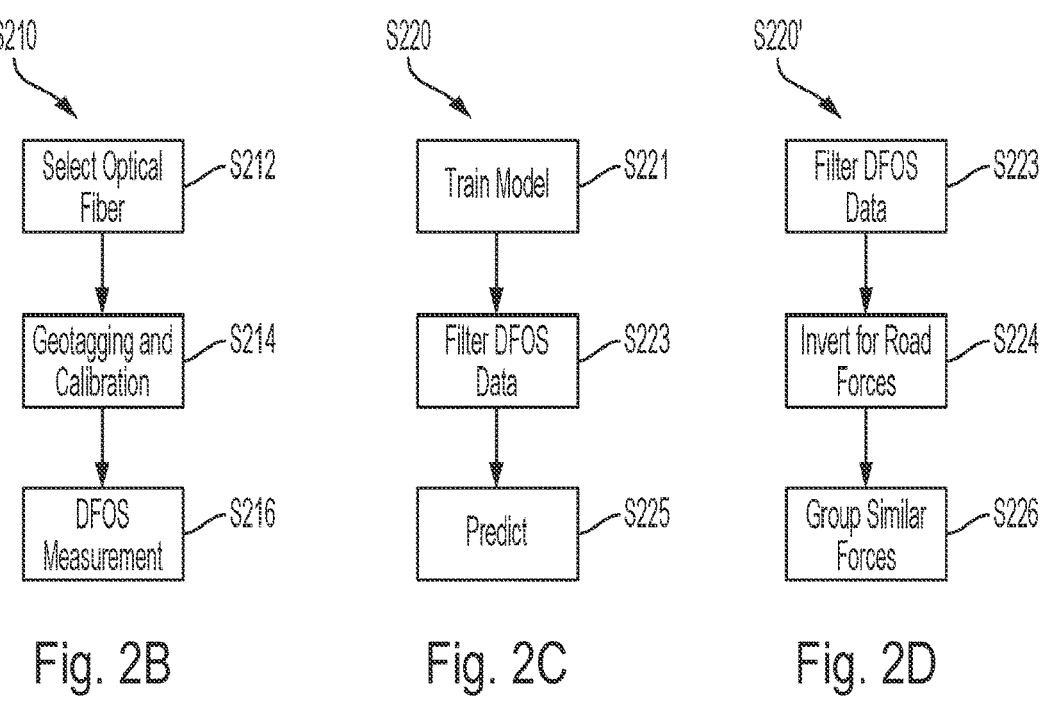
FIG. 2B illustrates an example of a process flow of recording DFOS data according to embodiments of the disclosed subject matter.
FIGS. 2C and 2D illustrate examples of processes for detection and location according to embodiments of the disclosed subject matter.

Referring now to FIG. 2B, the flow chart at S210 illustrates the process of preparing to and then recording DFOS data. Beginning at S212, the optical fiber and fiber channel are selected. This process involves choosing the specific piece of glass fiber and its embedded route, for example in a city or along a highway. A poor quality fiber route may degrade DFOS data quality, so optical path quality can be assessed at this stage using an Optical Time Domain Reflectometer (OTDR), and insertion losses can also be measured. Other information considered at this stage includes route details obtained from city maps of streets, maps of existing infrastructure like bridges and highways, street-level photography, aerial photography, fiber network as-built drawings and information about the network. Other considerations in selecting the optical fiber are distance from the road, burial depth, environment of installation, conduit, backfill, age, and geological information of the path. In embodiments, new dedicated fiber can be installed to provide one's own fiber to accomplish this selection step, which has the advantages of primary knowledge of the fiber, installation, and route.

Another determination made at S212 is whether the optical fiber has any present telecommunications signal transmission or plans to have telecommunications transmission in the future. If there is telecommunications transmission in the same fiber as would be potentially used for DFOS, this can be still utilized but there may be important commercial or logistical considerations to take into account in selecting this fiber instead of a different one. An additional consideration is the commercial value of a particular optical fiber in terms of the potential DFOS data it could record. In embodiments, a preliminary DFOS measurement or dataset, or information about the fiber path's location from a non-DFOS measurement source is used to select the optical fiber. For example, it is possible to sample the DFOS dataset of a set of candidate optical fibers, perform a data analysis process to identify or otherwise segment the dataset into portions of the array that have the potential to be used for applications that involve vehicles, object identification of a particular type, other human or infrastructure or natural phenomena, or which could be used to separate those parts of the fiber which are useful based on whether the fiber is coupled, or some other signal-to-noise (or another quality) evaluation at each position in the fiber optic cable. This type of analysis can yield a measurement of potential commercial value and therefore guide the selection of the optical fiber to be used in subsequent processing steps. All of the above considerations can be combined to finally arrive at a chosen fiber (or multiple fibers) which will be connected to the DFOS interrogator and used to record the DFOS data.

Then, at S214 the DFOS data begin to be recorded. The data is also associated with location, or geotagged. If the fiber location is precisely known based on the available information about the fiber's route, then this "geotagging" or assignment of the geolocation information (latitude, longitude, depth) to each position in the fiber is easier to do than if it is not available. The quality of available information has a significant impact on processing accuracy. In embodiments, one or more external acoustic sources (such as a sledge hammer or other impact source) is used to perform a tap test, wherein an acoustic signal is generated above an expected location of the fiber optic network being used to make the DFOS measurement. The position of the acoustic signal generation is documented using GPS or another method of high precision location. Seismic waves from the acoustic signal are recorded in the DFOS dataset, enabling registration of that physical position to the channel of the DFOS dataset. Linear interpolation can then be applied between physically geotagged positions in the network to a level of precision required, thus improving the geotagging accuracy.

In embodiments, geotagging is accomplished by relying on human or infrastructure or natural phenomena, such as vehicle noise or bridge resonance, to understand the data measured are near a road or bridge. A bridge is expected to be a source of increased acoustic energy due to vehicles passing over it, and the location of the bridge is known accurately, hence providing measurable data with known geographic information. This approach has the advantage of mitigating the time and effort required for a human to move around the field positions of the network to create the acoustic signals, which in many cases can requires many days to complete. In other embodiments, geotagging is accomplished by using unsupervised or supervised machine learning algorithms, such as k means, to cluster or segment the DFOS dataset into dissimilar and spatially clustered channels based on properties of the DFOS data. The properties in this case may relate to the data, such as the amplitude of noise in a particular frequency range, or the number of zero crossings, or the day/night ratio of energy in a particular frequency range, or the weekday/weekend ratio of energy in a particular frequency range, or another statistic that can be derived from the DFOS data, or a derivative measurement, such as the number of vehicles detected, or a measurement of the quality of coupling. For example, if a fiber optic network runs along a large bus terminal for 400 meters and then makes a left and runs down a quiet street for 600 meters, it is possible to segment the DFOS dataset into these two clusters and use additional information such as a street map of the fiber's general location to establish a high precision map of where DFOS data channels are physically located.

The second part of the process of geotagging and calibrating the optical fiber in order to record DFOS data, is to calibrate the DFOS data. The optical and environmental noise levels of the dataset can vary depending on optical setup, fiber condition, installation, fiber route, and fiber depth. In this step the DFOS data are tuned in order to account for this variation. It is possible to record this noise floor variability, and then utilize it in future sensing applications. In some embodiments, the calibration can be omitted.

At S216, DFOS measurements begin and DFOS data is recorded after properly selecting the optical fiber, and establishing the physical fiber position and also potentially also assessing the optical fiber noise level as noted above.

Following DFOS measurement setup, which includes optical fiber selection and geotagging/calibration, the DFOS measurements begin. Detection and Location processes S220 operate on DFOS measurement data, outputting the best fitting solution for road occupation (and other information) representing the locations and properties of forces in the road mesh. Next the road occupation information is clustered or otherwise associated at S230, and a unique vehicle identity is established, thereby enabling tracking of discrete vehicles based on their unique identities at S240. At this stage the vehicle's information can be tracked over time and queried. The overall process can continue indefinitely by recording data and processing in real time or near real time, or the process can be applied to previously recorded data to reconstruct vehicle traffic at a later time, until the process ends at S250.

In this detection method, DFOS data are used to determine whether or not a vehicle is present on the road and then an alert can be sent that a road is occupied or not occupied. Furthermore, the output of this method can cause another method to execute, such as a method that runs for every time sample and returns vehicle locations. By utilizing the detection method above first, and executing the location method only when vehicles are detected, computational resources are conserved. In other words, it is possible to avoid executing the location method until there is evidence that there are one or more vehicles on the road.

Vehicles are capable of disturbing their surroundings up to several kilometers away from the vehicle's location. When a vehicle is in the vicinity of an optical fiber embedded within a road, for example, the vehicle disturbance perturbs the media surrounding the optical fiber in various ways, and this perturbation is the basis for sending an alert that the vehicle is nearby.

One way in which the vehicle disturbs its surroundings is through mass loading, in which the mass of the vehicle deforms the roadbed and the neighboring region with a force proportional to the vehicles mass load. This force is applied at the tire-road contacts. The non-propagating deformation field exists within the vicinity of the vehicle and does not exist when the vehicle is absent. This phenomena can be referred to as ground deformation, static loading, static strain, or geodetic loading. This response is observed at high and low vehicle speeds, and hence may be useful for identifying even slow moving objects.

Additionally, the vehicle itself can produce vibrations which propagate through the ground and air as acoustic and elastic waves. These vibrations can be produced by the vibrating motor, moving mechanical parts, belts, stereo, wheels, axles, tires, tire-road contacts, and/or additional components affixed to the vehicle, and/or the motion of the vehicle's mass on its suspension. This type of vibration can propagate away from the vehicle's immediate vicinity in a causal manner (moving out from the vehicle's location over time if the vehicle were standing still). This phenomena can be referred to as ground motion, seismic wave propagation, dynamic strain, or the vibration field. The amplitude of vibration is commonly identified to increase with vehicle speed.

Either of the above types of vehicle disturbance can be used in a detection process S220 to send an alert about vehicle presence or characteristics whenever the vehicle is within the vicinity of the DFOS sensor. Because the method of estimating vehicle location can be run for any time sample it is not necessary to detect vehicles before locating them, but it is more efficient to only continue to location determination after detection of one or more vehicles.

In embodiments, a classical thresholding algorithm is used and it sends an alert when, for example, the DFOS power spectral density or a different statistical measure of signal energy, perhaps filtered in a certain signal frequency range, and/or averaged in some manner over a specified time or range of sensor positions, rises above a specified threshold. As the sending of an alert at a given time sample is a binary flag (either alert or no alert), the sending of the alert is an indication of the presence or absence of vehicles, and as such it might be caused by one or more vehicles. If the alert was caused by more than one vehicle, there is no modification to the algorithm.

Referring to FIGS. 2C and 2D, a detection and location process S220 and alternate process S220' are illustrated. At a high level, the process will be referred to as the Location Method, but it also includes detection. In the Location Method, vehicle geodetic loading signals from DFOS data are used to solve for the force distribution (e.g., vehicle positions) at specific locations within a road mesh which best explain the recording. The result of the Location Method is a data set, possibly stored in a database, where the model of road occupancy with auxiliary properties are tabulated for further analysis.

At S221, the method trains the model that is used to later make predictions of the force distribution, road occupancy and/or auxiliary properties. One way this is accomplished is to use a supervised encoder or autoencoder architecture familiar to those practiced in machine learning or artificial intelligence with labeled DFOS data. For example, a convolutional neural network comprising multiple layers of fully connected, max pooling, and other types of layers are trained at S221 with labels of the true result given the input DFOS data gathered previously. The iterative process of training the model in S221 aims to improve the layer weighting functions, such that the final model has predictive power when presented with new or unlabeled data. In this case, the labels may be vehicle positions, vehicle sizes, vehicle weights, number of vehicles passing a location per unit of time, or similar. The labels might be gathered from human visual/audio observations of vehicles recorded by hand in the field, or recorded using a camera or video, or be the output of a computer vision algorithm that has been applied to audio or camera or video recordings, or the output of another sensor that establishes a label. The model may be trained from a starting place consisting of layer nodes having random weights and bias terms, or using the weights and bias terms established by prior training (i.e., transfer learning), and further training may occur using labeled DFOS data (additional layers and/or fine-tuning), or not.

A second formulation of S221 is to use reinforcement learning to train the encoder or auto-encoder model. In this case the physical relationship between DFOS measurements and the force distribution (e.g., vehicle positions) at specific locations within a road mesh, or road occupancy or auxiliary properties could be the target for training. Labeled data may be also provided, or not.

Then, at S223, the process continues with filtering the DFOS data by applying a series of signal processing routines that prepare the data for input into the trained model, such as bandpass filtering. This filtering step may include further application of one or multiple auto-encoder(s) to remove undesirable noise in the dataset.

Continuing at S225, the process makes a prediction of one or more vehicles' locations and other characteristics that would best explain the measurements obtained by the DFOS system.

Referring now to FIG. 2D, an alternate embodiment of the process of detection and localization is shown. This embodiment begins with S223, which is already described above. Continuing with S224, the DFOS data are filtered using a series of signal processing routines, such as bandpass filtering the data. This filtering step may include further application of one or multiple auto-encoder(s) to remove undesirable noise in the dataset. Then, continuing at S224, the process inverts the filtered DFOS data for road forces. This matrix inversion process utilizes the inverted form of the linear system of equations relating forces on the road to the resulting effect on the optical fiber cable, having been precomputed for computational efficiency. Then, the output forces or force distribution that are considered to be similar based on amplitude or proximity are grouped together at S226. Where the result at S224 is an estimate of the present road forces, the result at S226 is an estimate of present vehicles.

Figure 3:
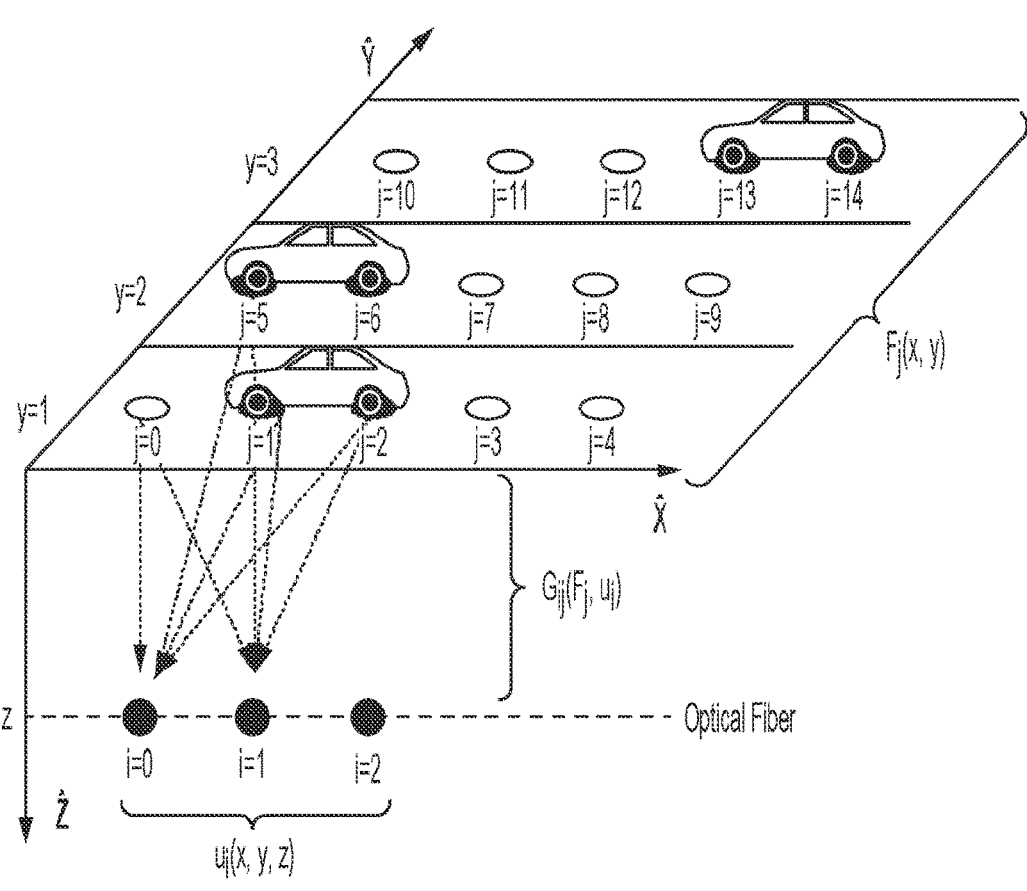
FIG. 3 illustrates a diagram depicting hypothetical vehicle positions on a road according to embodiments of the disclosed subject matter.

Conceptually, vehicles can be approximated in a 3-D Cartesian coordinate system as collections of point loads that distribute any vehicle's total mass as a vertical force or set of vertical forces centered at one or multiple road mesh nodes, as shown in FIG. 3. The coordinate system is defined as following: x=along-fiber axis incremented by sensor position; y=lane offset axis; z=depth, where z=0 is the road surface. Optical fiber cables are commonly laid along the road, so by convention this orientation can be adopted, but the DFOS axis can be rotated if the cable were oriented in a different direction, or the method can be extended to capture a different component of ground deformation. The method might assume that a road mesh node is acted upon with a vertical force or combination of vertical and horizontal forces, taking into consideration the number of wheels supporting the vehicle and the vehicle's mass. Each force is assumed to act at an infinitesimal point located at the center of tire-road contact, but this can be relaxed into a more realistic area of contact.

Referring to FIG. 3, an exemplary diagram depicts hypothetical vehicle positions on a 3-lane, single-direction road with a fiber buried at a depth z and the 3 lanes being offset from the fiber in the road-parallel direction by distances y=1, y=2, and y=3. In this example, the Cartesian coordinate system has its x-axis along the optical fiber path, the z-axis in depth and the y-axis is the road offset axis. The method utilizes the concept that DFOS data recorded at DFOS sensor i is fully described in a unique way by a linear combination of ground motion/deformation caused by the occupying vehicles represented by source vector $F_j$ in the horizontal plane (xy). The physical model describing how a source at $F_j$ generates a signal at DFOS sensor i is represented by the transfer function $G_{ij}$.

In embodiments, the lane position may be a lane quantization, such that a discrete lane is identified for the tracked vehicle, instead or in addition to the specific Y position. A vehicle's exact position in the Y direction will vary due to the vehicle's wheel spacing and the specific path taken by the vehicle, but a threshold or a range of Y positions can be selected that will indicate which specific lane, on a multi-lane road, is occupied by the vehicle. When a vehicle changes lanes, the move from one lane to another can be detected based on the lane quantization.

The road mesh is determined before the method is executed, and is designed to contain all of the possible positions in the x-y plane (road surface) where a vehicle can be located by the method (see FIG. 3 for a depiction of the geometry). The total range of the road mesh in the y-axis can include one lane, multiple lanes, and/or additional area beyond the road. The total range of the road mesh in the x-axis can include the full fiber sensing path or a subset of the fiber sensing path in x. The granularity of the road mesh is variable and depends on the desired resolution of the solution, computational demands of the method, or a related consideration. By way of an example, the mesh node increment can be set to the size of a single vehicle such that each road mesh node would represent the vertical force caused by an individual vehicle's total mass. Alternatively, the mesh node increment can be set to a slightly finer size of a few meters or less, wherein the forces being solved at any one time sample would represent the vertical forces being applied at the individual axle load bearing a portion of the vehicle's load front-to-back. A third example is that the road mesh can be even finer in order to represent the individual tire-road contact forces which each bear a portion of the total vehicle load. The road mesh increment does not have to be uniform. The road mesh increment can be different in the x-axis and y-axis. The road mesh may be oversampled or undersampled in order to resolve the location of a vehicle within a lane, the non-occupied space between a vehicle's wheels, the non-occupied space between two vehicles, the total force due to a group of vehicles, and/or the total force on a portion of the road. The fiber path does not have to be located within the road mesh.

The roadbed 140 and neighboring region is assumed to deform in response to each vehicle's mass. An embodiment of the disclosed location method utilizes the concept that any one DFOS measurement ($u_i$) at a DFOS sensor is fully described in a unique manner by the linear combination of ground deformation caused by the occupying forces represented by source vector ($F_j$) in the road mesh. The physical model describing how a source ($F_j$) generates a response that is readily obtained using DFOS ($u_i$) is represented by the transfer function ($G_{ij}$). $G_{ij}$ is also referred to as a forward operator because it describes how a force at position $F_j$ relates in a forward modeling sense to the ground response at position ($u_i$) in the DFOS array.

The native DFOS measurand ($u_i$) can be any of several different quantities depending on the particular DFOS instrument 100 hardware and any processes applied to the received light. A different theoretical expression linking the applied forces in the road mesh to the DFOS measurement value would be equally valid in a different case. The native DFOS measurand can therefore be a single-component or multi-component measurement of static strain, dynamic strain, strain-rate, acceleration, velocity, displacement, or the shape of an optical fiber, or a different quantity. This type of native DFOS measurand or a derived value thereof can be related to any source force ($F_j$).

In an embodiment, a DFOS measurand is strain and the fiber is oriented as described above in the colinear horizontal orientation such that the recorded strain at each DFOS sensor is the in-line horizontal strain component ($\epsilon_{xx}$) with a spatial resolution of the specified DFOS gauge length (L). In the present example it is assumed that all forces are vertical forces, and the road mesh is designed with a granularity of 1 m. Gauge length notation is used wherein the DFOS sensor is centered at ($x_L$) which denotes that the following strain is equal to the difference of the two displacements (D) at either end of the gauge length ($x_0 = x_L - L/2$ and $x_1 = x_L + L/2$ are the gauge length end points) divided by the reference gauge length, as in equation (1):

$$\epsilon_{xx}(x_L) = \frac{D(x_0) - D(x_1)}{L} \qquad [1]$$

In this example case, using static field theory (e.g., Boussinesq-Flamant) it is possible to relate the recorded deformation over a segment of DFOS sensor positions to the magnitude and location of all vertical force point loads $F_z$ (x,y) within the neighborhood using an expression such as equation (2):

$$\epsilon_{xx}(x_L) = \frac{F_z}{4\pi\mu L}\left[\left(\frac{x_0}{R_0}\left(\frac{z}{R_0^2} - \frac{(1-2v)}{R_0+z}\right)\right) - \left(\frac{x_1}{R_1}\left(\frac{z}{R_1^2} - \frac{(1-2v)}{R_1+z}\right)\right)\right] \qquad [2]$$

where $\mu$ is the shear modulus (a property of the subsurface), $v$ is Poisson's ratio (another property of the subsurface), x is the separation length along the x-axis between the road mesh node and the sensor, y is the separation length along the y-axis between the road mesh node and the sensor, z is the separation length in depth between the road's surface and the fiber sensor's depth, and $R = \sqrt{x^2+y^2+z^2}$ represents the 3-D separation length from the road mesh node to the DFOS sensor end point incremented according which end of the sensor gauge length the distance is drawn. The true set of forces occupying the road $F_z(x, y)$ can be exact and can be considered a function of the road mesh coordinates with entries of each road mesh node.

By way of demonstrating the validity and usability of the method to locate vehicles, the preceding example is further expanded. The best fit solution to Equation [2] is solved for $F_z(x, y)$, referred to here as the model, $\tilde{F}_z(x, y)$, which approximates the true set of forces loading of the road $F_z(x, y)$ in Equation [2].

One way to do this is to expand the bracketed term (the term with x-dependence) above as a Taylor series about x=0 and then use the DFOS observations ($\epsilon_{xx}$) to find the best fit solution ($\tilde{F}_z$).

$$\frac{x}{\sqrt{x^2+y^2+z^2}}\left(\frac{z}{x^2+y^2+z^2} - \frac{1-2v}{\sqrt{x^2+y^2+z^2}+z}\right)$$

The Taylor expansion of the bracketed term at x=0 is:

$$\frac{x\left(\frac{2v-1}{\sqrt{y^2+z^2}+z} + \frac{z}{y^2+z^2}\right)}{\sqrt{y^2+z^2}} + \qquad [3]$$

$$\frac{x^3\left(-2y^2\left((2v-1)\sqrt{y^2+z^2} + (v+1)z\right) - z^2\left(4(v+1)\sqrt{y^2+z^2} + (2v+5)z\right)\right)}{\left(2(y^2+z^2)^{5/2}\left(\sqrt{y^2+z^2}+z\right)^2\right)} +$$

$$\cdots \frac{x^5\left(8(2v-1)y^4 + 2y^2z\left(3(3v+1)\sqrt{y^2+z^2} + (19v+13)z\right) + z^3\left(3(6v+17)\sqrt{y^2+z^2} + (22v+49)z\right)\right)}{\left(8(y^2+z^2)^{7/2}\left(\sqrt{y^2+z^2}+z\right)^3\right)} + O(x^6)$$

Next, Equation [2] is rewritten in standard form up to a chosen accuracy level (in this case, $0(x)^5$):

$$\epsilon_{xx}(x_L) = \left(A(x_0 - x_1) + B(x_0 - x_1)^3 + C(x_0 - x_1)^5\right)\tilde{F}_z \qquad [4]$$

where the terms with x-dependence of varying order have coefficients A, B, C, which are equal to:

$$A = \left(\frac{1}{4\pi\mu L}\right)\frac{\frac{2v-1}{\sqrt{y^2 + z^2} + z} + \frac{z}{y^2 + z^2}}{\sqrt{y^2 + z^2}}, \qquad [5]$$

$$B = \left(\frac{1}{4\pi\mu L}\right)\frac{\left(-2y^2\left((2v-1)\sqrt{y^2+z^2} + (v+1)z\right) - z^2\left(4(v+1)\sqrt{y^2+z^2} + (2v+5)z\right)\right)}{\left(2(y^2+z^2)^{5/2}\left(\sqrt{y^2+z^2}+z\right)^2\right)},$$

$$C = \left(\frac{1}{4\pi\mu L}\right)\frac{\left(8(2v-1)y^4 + 2y^2z\left(3(3v+1)\sqrt{y^2+z^2} + (19v+13)z\right) + z^3\left(3(6v+17)\sqrt{y^2+z^2} + (22v+49)z\right)\right)}{\left(8(y^2+z^2)^{7/2}\left(\sqrt{y^2+z^2}+z\right)^3\right)}.$$

The coefficients in Equation [4] depend only on y, z, L, μ, v. These three coefficients are just examples. It is possible to add or remove some of these terms in Equation [4] to improve or reduce the order of accuracy, respectively. Note that the model $\tilde{F}_z$ is an approximation of $F_z$ as a result of this series truncation. Reducing the accuracy is a tradeoff for reduced computation load.

The generalized form of the problem in which we seek a best fitting model ($\tilde{F}_j$) that contains the forces occupying the road mesh nodes which best explains the recorded DFOS measurement ($u_i$), given transfer function ($G_{ij}$) is discussed next. In matrix form the generalized problem takes the form:

$$\begin{bmatrix} u_{i=0} \\ u_{i=1} \\ \vdots \\ u_{i=N} \end{bmatrix} = \begin{bmatrix} G_{i=0}^{j=0} & G_{i=0}^{j=1} & \cdots & G_{i=0}^{j=M} \\ G_{i=1}^{j=0} & G_{i=1}^{j=1} & \cdots & G_{i=1}^{j=M} \\ \vdots & \vdots & \ddots & \vdots \\ G_{i=N}^{j=0} & G_{i=N}^{j=1} & \cdots & G_{i=N}^{j=M} \end{bmatrix} \begin{bmatrix} \tilde{F}_{j=0} \\ \tilde{F}_{j=1} \\ \vdots \\ \tilde{F}_{j=M} \end{bmatrix} \qquad [7]$$

It is possible to solve for the model vector ($\tilde{F}_j$) using one or a combination of multiple statistical optimization method (s). The optimization method seeks the best fit solution or family of solutions bounded by a plausible parameter model space and can use regularization or weighting to introduce conditions which aid in the search for ($\tilde{F}_j$). Some of the methods include a single-parameter or multi-parameter grid search, simple least squares, maximum likelihood, weighted least squares, Gaussian process, Markov chain Monte Carlo, Bayesian estimation, neural network, supervised or unsupervised learning, deep learning, or a similar process. By way of an example, it is possible to use simple least squares, as in equation (8):

$$\tilde{F}_j = \left(G_{ij}^T G_{ij}\right)^{-1}\left(G_{ij}^T u_i\right) \qquad [8]$$

The example optimization method described in Equation [8] can be conducted for each time step in real-time because the major numerical cost of the problem is related to inverting the matrix $$\left(G_{ij}^T G_{ij}\right),$$

which can be done before the DFOS measurement step (pre-computed) because it is only based on knowledge of the DFOS measurement, road-fiber geometry, and local geology. This method is also sufficiently parallel to enable additional computational efficiency by subdividing the matrix operations by optical fiber segment.

It will be appreciated that the Location Method of S220 or S220' can be subdivided over multiple computer processors in order to find a model solution more quickly. The computation can be divided in a parallel manner owing to the computational efficiency described in the preceding paragraph. Subdividing the transfer function ($G_{ij}$) can be done in a manner that accounts for the total area of the geodetic loading signal neighborhood.

In an embodiment, a vehicle occupies a road position such that it causes the surrounding media within a 45 m radius to deform by an amount that is considered detectable using a colinear optical fiber buried at 1 m depth directly below the vehicle's path, perhaps 1 microstrain or less or more. If the DFOS gauge length were 3 m, and no overlapping gauges were used to form each DFOS sensor, then only the 15 DFOS sensors centered on the vehicle's position would detect this particular vehicle's geodetic loading field. Including more than 15 sensors in any processor's estimate of a model subset would be inefficient from this standpoint of the additional information being added. This knowledge is used to determine how to subdivide the problem, including how to subset the transfer function ($G_{ij}$), the DFOS data being analyzed, and the portion of the output model or section of road being solved. This concept depends on the geometry of the problem and the DFOS method's detection limit and also the gauge length.

Figure 4A:
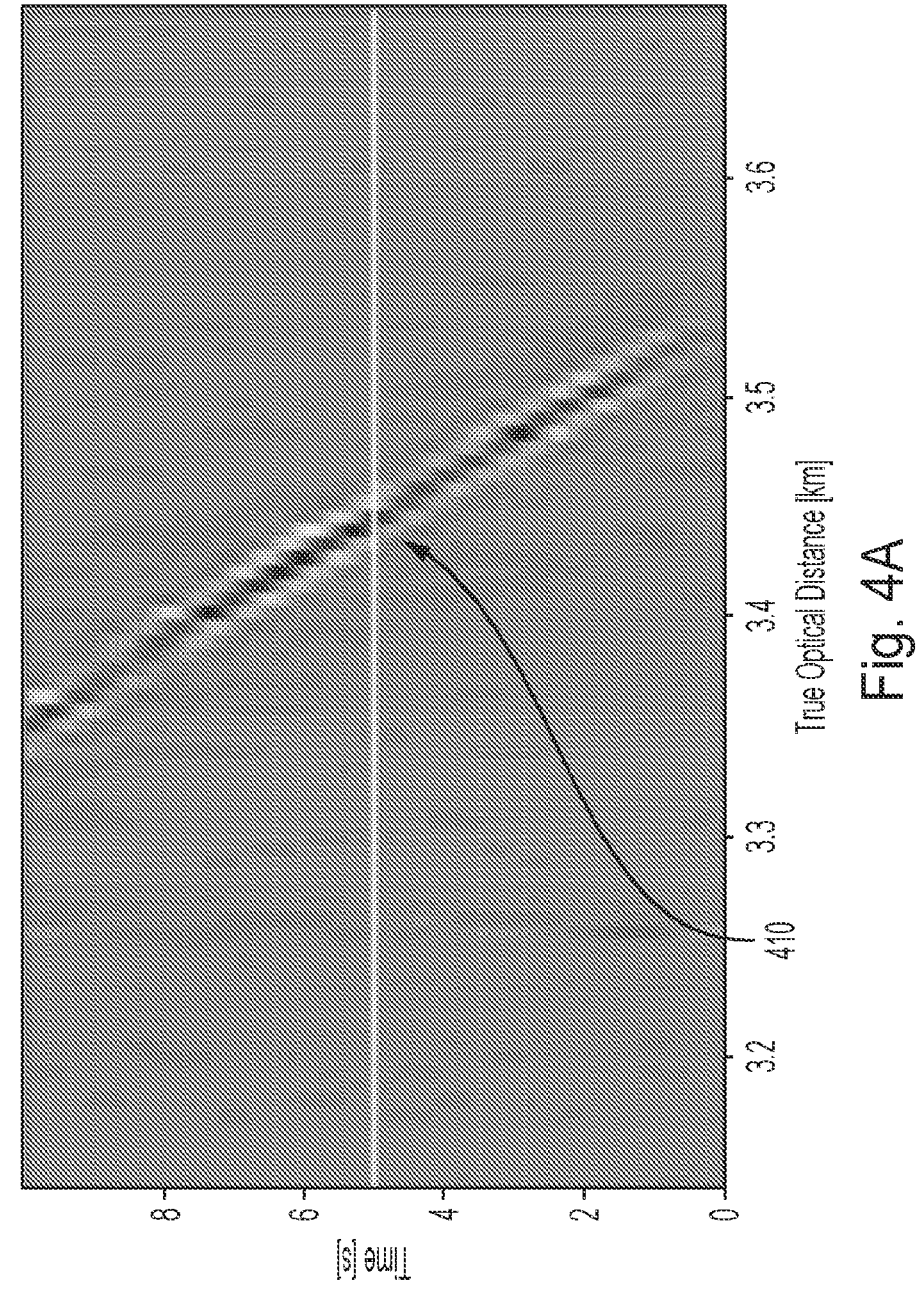
FIGS. 4A and 4B illustrate exemplary data collected in accordance with embodiments of the disclosed subject matter.
Figure 4B:
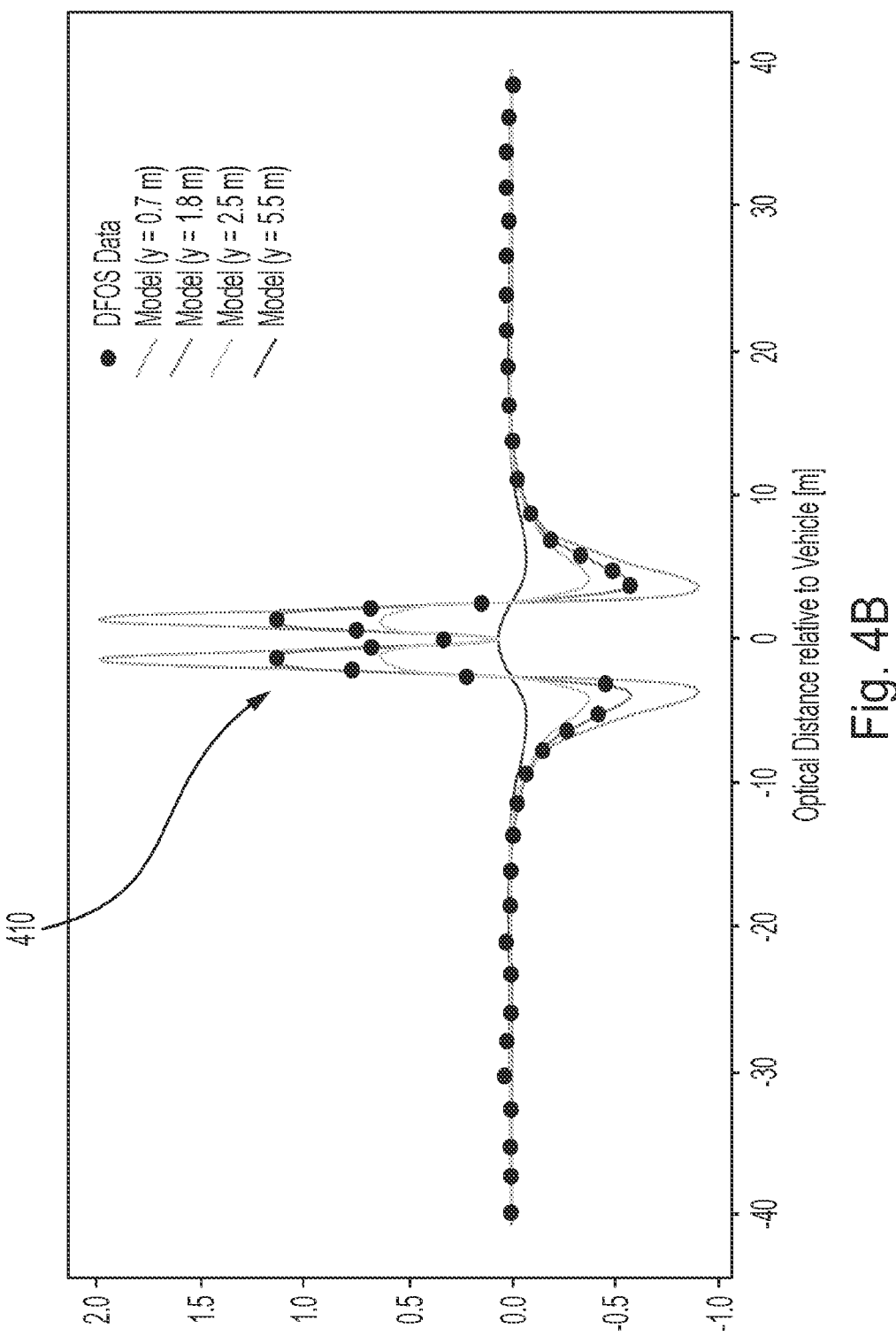

Referring to FIGS. 4A and 4B, an example of DFOS data measurement and analysis is shown. In FIG. 4A, an example 9.5 second DFOS recording is made along an example optical fiber. Major moving feature 410 at 3.53 km to 3.32 km is ground motion of 4-wheeled passenger vehicle driving in first lane, offset 1.9 m from fiber path. The horizontal white line indicates a time sample of data during the moving feature 410 and is shown in FIG. 4B. In FIG. 4B, DFOS data is represented as black circles recorded at consecutive optical fiber sensor positions for time indicated in FIG. 4A. Physical models of strain due to load at varying offsets centered at 4 different lane position are plotted. A best fit model locates vehicle at 1.8 m offset (y=1.8 m).

The result of applying the Location Method at a time sample is a model that corresponds to the distribution of forces on the road. In embodiments, each model output from the Location Method is saved in a tabulated database like the one shown in Table 1 (below) for the purpose of additional querying and computation.

TABLE 1

| Time | Latitude | Longitude | Lane | Force |
|---|---|---|---|---|
| . | . | . | . | . |
| . | . | . | . | . |
| . | . | . | . | . |
| 2019-07-16T04:23:44.126 | 37.871735° N | 122.258444° W | 1 | 35.30 kN |
| 2019-07-16T04:23:44.126 | 37.871923° N | 122.258508° W | 3 | 15.01 kN |

TABLE 1-continued

| Time | Latitude | Longitude | Lane | Force |
|---|---|---|---|---|
| 2019-07-16T04:23:44.252 | 37.871734° N | 122.258444° W | 1 | 35.30 kN |
| 2019-07-16T04:23:44.252 | 37.871924° N | 122.258508° W | 3 | 15.01 kN |
| 2019-07-16T04:23:44.378 | 37.871733° N | 122.258444° W | 1 | 35.30 kN |
| 2019-07-16T04:23:44.378 | 37.871926° N | 122.258507° W | 3 | 15.01 kN |
| 2019-07-16T04:23:44.504 | 37.871732° N | 122.258443° W | 1 | 35.30 kN |
| 2019-07-16T04:23:44.504 | 37.871928° N | 122.258507° W | 3 | 15.01 kN |
| 2019-07-16T04:23:44.630 | 37.871731° N | 122.258443° W | 1 | 35.30 kN |
| 2019-07-16T04:23:44.630 | 37.871929° N | 122.258506° W | 3 | 15.01 kN |
| 2019-07-16T04:23:44.756 | 37.871729° N | 122.258442° W | 1 | 35.30 kN |
| 2019-07-16T04:23:44.756 | 37.871929° N | 122.258506° W | 3 | 15.01 kN |
| 2019-07-16T04:23:44.882 | 37.871728° N | 122.258442° W | 1 | 35.30 kN |
| 2019-07-16T04:23:44.882 | 37.871929° N | 122.258506° W | 3 | 15.01 kN |
| . | . | . | . | . |
| . | . | . | . | . |
| . | . | . | . | . |

Table 1 shows an example of saving a solution vector in a tabulated database. The result of applying the method to the DFOS data at a time sample is a solution vector that can represent the best fit model for road occupation at that time. A method of saving solution vectors in a tabulated database like the one shown here enables additional querying/computation. Depending on the chosen resolution of the road occupation mesh, the solution vector can contain information about vehicles at the granularity of individual wheels, axles, full vehicles, or groups of vehicles. At each time sample, one or multiple rows can be added to the database representing any of this granularity or similar. The columns of each row entry can include position and/or property information such as the latitude and longitude, relative horizontal position, change in horizontal position, lane position, change in lane position, force amplitude, change in force amplitude, or other solution information. A tabulated database can be used for each.

Model outputs below a threshold may be assumed to simply be noise and discarded. Depending on the chosen resolution of the road occupation mesh, the model outputs can contain information about vehicles at the granularity of individual wheels, axles, full vehicles, or groups of vehicles. At each time sample, one or multiple rows can be added to the database representing any of this granularity or similar. The columns of each row entry can include property information such as the latitude and longitude, relative horizontal position, lane position, force amplitude, or other model solution information derived from the optimization method.

Figure 5:
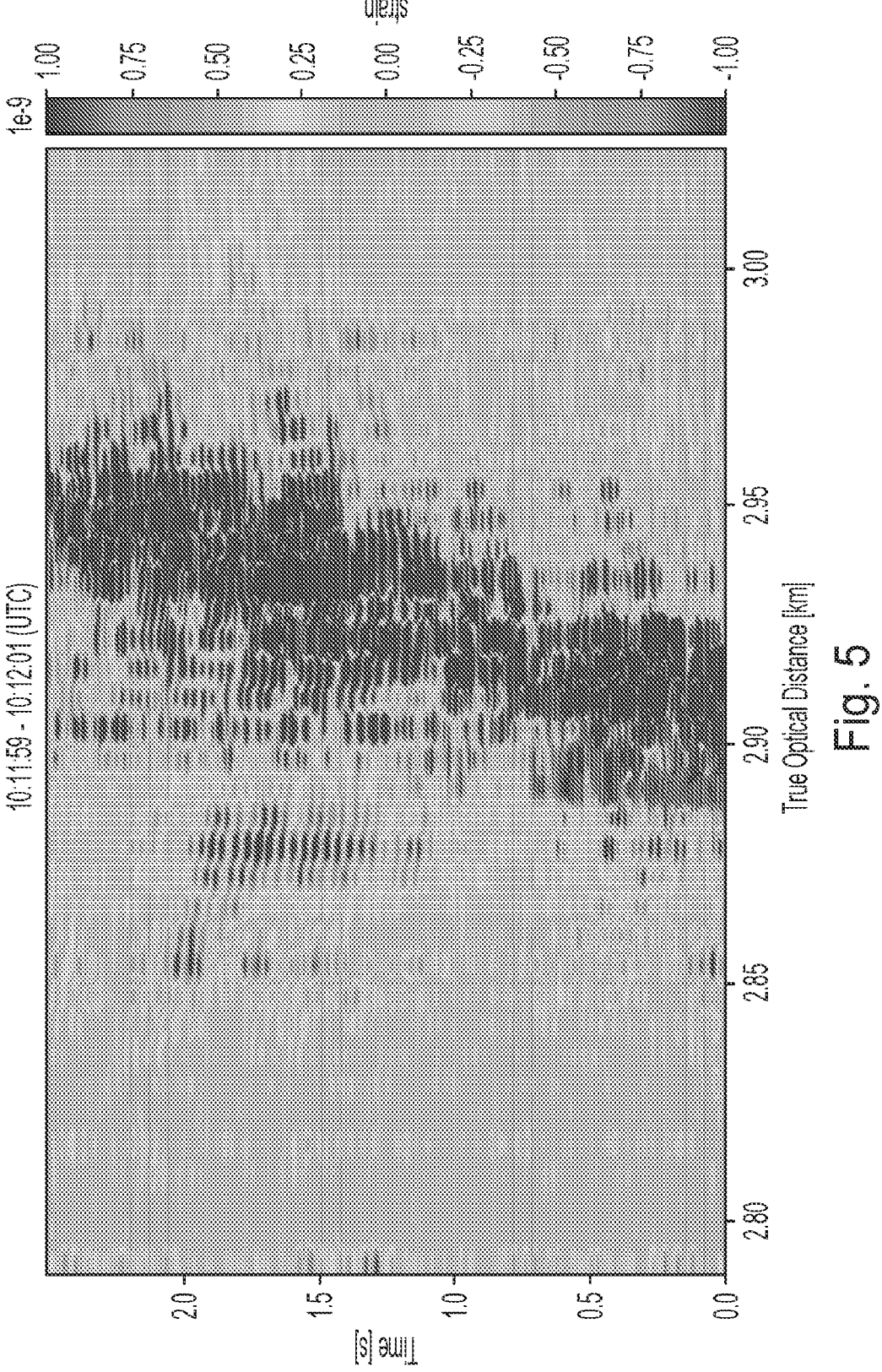
FIG. 5 illustrates an example of auxiliary DFOS data recording according to embodiments of the disclosed subject matter.

As shown in FIG. 5, DFOS data that represents more than just the vehicle location can be recorded and analyzed. The strain recorded during 2.5 seconds over an optical fiber segment approximately 0.25 km long within the signal frequency range of 5-30 Hz (zerophase Butterworth bandpass filter) is shown in FIG. 5. The energy here is described as auxiliary because it is related to the vehicle and unrelated to the physics of the static loading data used in the location method. This type of auxiliary data can be used to develop additional property values to further confirm a vehicle's identity and/or to provide valuable insights about vehicles that travel to specific locations, and form correlations between vehicle properties and locations. Such correlation data is valuable for targeted advertising and other uses.

Next, auxiliary model properties can be appended to the model output tabulated database, as shown in Table 2 (below).

TABLE 2

| Time | Latitude | Longitude | Lane | Force | Mass | Peak freq. |
|---|---|---|---|---|---|---|
| . | . | . | . | . | . | . |
| . | . | . | . | . | . | . |
| . | . | . | . | . | . | . |
| 2019-07-16T04:23:44.126 | 37.871735° N | 122.258444° W | 1 | 35.30 kN | 3530 kg | 15.8 Hz |
| 2019-07-16T04:23:44.126 | 37.871923° N | 122.258508° W | 3 | 15.01 kN | 1501 kg | 11.8 Hz |
| 2019-07-16T04:23:44.252 | 37.871734° N | 122.258444° W | 1 | 35.30 kN | 3530 kg | 15.8 Hz |
| 2019-07-16T04:23:44.252 | 37.871924° N | 122.258508° W | 3 | 15.01 kN | 1501 kg | 30.0 mph |
| 2019-07-16T04:23:44.378 | 37.871733° N | 122.258444° W | 1 | 35.31 kN | 3531 kg | 30.0 mph |
| 2019-07-16T04:23:44.378 | 37.871926° N | 122.258507° W | 3 | 15.01 kN | 1501 kg | 30.1 mph |
| 2019-07-16T04:23:44.504 | 37.871732° N | 122.258443° W | 1 | 35.30 kN | 3530 kg | 30.0 mph |
| 2019-07-16T04:23:44.504 | 37.871928° N | 122.258507° W | 3 | 15.01 kN | 1501 kg | 35.5 mph |
| 2019-07-16T04:23:44.630 | 37.871731° N | 122.258443° W | 1 | 35.30 kN | 3530 kg | 35.3 mph |
| 2019-07-16T04:23:44.630 | 37.871929° N | 122.258506° W | 3 | 15.01 kN | 1501 kg | 35.5 mph |
| 2019-07-16T04:23:44.756 | 37.871729° N | 122.258442° W | 1 | 35.31 kN | 3531 kg | 25.4 mph |
| 2019-07-16T04:23:44.756 | 37.871929° N | 122.258506° W | 3 | 15.01 kN | 1501 kg | 20.0 mph |
| 2019-07-16T04:23:44.... | 37.871728° N | 122.258442° W | 1 | 35.30 kN | 3530 kg | 35.5 |

TABLE 2-continued

| Time | Latitude | Longitude | Lane | Force | Mass | Peak freq. |
|---|---|---|---|---|---|---|
| 16T04:23:44.882 | N | W | | kN | kg | mph |
| 2019-07- | 37.871929° | 122.258506° | 3 | 15.01 | 1501 | 35.5 |
| 16T04:23:44.882 | N | W | | kN | kg | mph |
| . | . | . | . | . | . | . |
| . | . | . | . | . | . | . |
| . | . | . | . | . | . | . |

Table 2 illustrates an example of calculating new properties from solution output—Additional columns can be added to tabulated database entries at the time of saving or before or afterwards. For example, by assuming that the total force magnitude is due to a vertical mass one can compute the mass related to each force. A second example is that the instantaneous speed can be computed using the change in horizontal position along the road. Additional new properties might include properties computed using the original or processed DFOS dataset, such as the peak frequency or maximum amplitude or another statistical measure.

One type of auxiliary property information can be properties which are computed using a model output property from the Location Method. For example, the model may contain a force magnitude that can be used to compute a proportional mass using the constant of gravitational acceleration ($9.8 \text{ m/s}^2$). A second type of new property information that can be appended at this time is outside information contained in the DFOS data but not used during the Location Method described above. For example, a statistical measure about the vehicle's vibration field, such as the maximum frequency, frequency variance, maximum value at a particular frequency, or a similar metric may be collected and stored as a new property in the tabulated data.

Saving these auxiliary model properties alongside the model output from the Location Method is inexpensive to compute but can be useful during the Association Method at S230 and/or Tracking Method at S240. The additional model property information can contain characteristic information about the vehicle or vehicle axle or vehicle wheel. This concept is referred to as vehicle fingerprinting.

It will be appreciated that there is a speed dependence of the amplitude of the propagating frequencies versus the speed independence of the vehicle weight field amplitudes. This recognition is beneficial in the weight field techniques maintaining superior track performance on slowly moving objects like aircraft taxi or cars slowing down at traffic lights. The amplitude of the propagating frequencies associated with tire contact noise scales as a cubic function of vehicle speed. In other words, as the vehicles slow down to walking pace the amplitude of the frequencies between approximately 10-80 Hz reduces significantly.

In the Vehicle Association Method (S230), the tabulated database of model properties for recent time samples developed using DFOS data are used to distinguish individual vehicles and a novel model property called the Vehicle ID is assigned.

The model output from multiple consecutive time samples may be very similar because the motion of any vehicle, the DFOS methodology, and the transfer of forces through the subsurface are all causal, meaning that similar DFOS data with similar property values will be produced within a local region in space and a short duration in time. As an example, the model forces in the road occupancy mesh can be translated up or down the road as a function of time if a vehicle is driving up the street where the sensing is occurring. Non-location model properties such as the mass, mass distribution, maximum frequency in the vibration field range, frequency variance, total power, or another statistic associated to the tabulated entry should also be similar. Certain vehicle properties are time invariant (do not change), for example, the horizontal separation of vehicle tire-road contact points (i.e., wheelbase and track width), axle count, and total area do not change over time, and this information can also be used to uniquely identify distinct vehicles. Using this concept, the tabulated data set over multiple time samples is sorted and/or grouped by tabulated database property column(s) and then assigned as being related to one unique vehicle identifier as shown in Table 3 (below).

TABLE 3

| Time | Latitude | Longitude | Lane | Mass | Peak freq. | Vehicle id |
|---|---|---|---|---|---|---|
| . | . | . | . | . | . | . |
| . | . | . | . | . | . | . |
| . | . | . | . | . | . | . |
| 2019-07-16T04:23:44.126 | 37.871735° N | 122.258444° W | 1 | 3530 kg | 30.1 | 4504953 |
| 2019-07-16T04:23:44.252 | 37.871734° N | 122.258444° W | 1 | 3530 kg | 30.0 | 4504953 |
| 2019-07-16T04:23:44.378 | 37.871733° N | 122.258444° W | 1 | 3531 kg | 30.1 | 4504953 |
| 2019-07-16T04:23:44.504 | 37.871732° N | 122.258443° W | 1 | 3530 kg | 30.0 | 4504953 |
| 2019-07-16T04:23:44.630 | 37.871731° N | 122.258443° W | 1 | 3530 kg | 30.0 | 4504953 |
| 2019-07-16T04:23:44.756 | 37.871729° N | 122.258442° W | 1 | 3531 kg | 30.1 | 4504953 |
| 2019-07-16T04:23:44.882 | 37.871728° N | 122.258442° W | 1 | 3530 kg | 30.0 | 4504953 |

TABLE 3-continued

| Time | Latitude | Longitude | Lane | Mass | Peak freq. | Vehicle id |
|---|---|---|---|---|---|---|
| 2019-07-16T04:23:44.126 | 37.871923° N | 122.258508° W | 3 | 1501 kg | 35.5 | 4504954 |
| 2019-07-16T04:23:44.252 | 37.871924° N | 122.258508° W | 3 | 1501 kg | 35.3 | 4504954 |
| 2019-07-16T04:23:44.378 | 37.871926° N | 122.258507° W | 3 | 1501 kg | 35.5 | 4504954 |
| 2019-07-16T04:23:44.504 | 37.871928° N | 122.258507° W | 3 | 1501 kg | 25.4 | 4504954 |
| 2019-07-16T04:23:44.630 | 37.871929° N | 122.258506° W | 3 | 1501 kg | 20.0 | 4504954 |
| 2019-07-16T04:23:44.756 | 37.871929° N | 122.258506° W | 3 | 1501 kg | 35.5 | 4504954 |
| 2019-07-16T04:23:44.882 | 37.871929° N | 122.258506° W | 3 | 1501 kg | 35.5 | 4504954 |
| . | . | . | . | . | . | . |
| . | . | . | . | . | . | . |
| . | . | . | . | . | . | . |

Table 3 represents an example of sorting the tabulated database and associating a vehicle id as would happen at S230. The solution output from multiple time samples could be very similar because the motion of any vehicle is causal and hence will produce DFOS data with similar features and in the proximity of previous time samples, perhaps only translated up or down the road. Using this concept, the tabulated database is sorted and/or grouped by database column(s) over multiple time samples and then assigned a unique vehicle id. In the case where the road occupancy mesh is set to be the granularity of a part of a full vehicle, such as if a solution vector is comprised of individual axle or wheel entries, then rows for all wheels can be associated together or kept separate in order to analyze wheel behavior. Once established, an entry's location and property information through time and space is linked, thus enabling, for example, a vehicle location history query, a vehicle location forecast, a vehicle behavioral analysis query, or a vehicle behavioral change analysis query.

The association of like properties can be achieved numerically using any of a number of different similarity or clustering algorithms applied to the recent time range of tabulated values, which is related to the set of unknown vehicles presently occupying the road. One exemplary method of numerical association would be to measure the similarity between each model and every other model in a 1-by-1 or 1-by-N sense using either one or multiple properties. This similarity test can be computationally expensive (scaling like the square of the number of models, $N^2$), but provides one example of a Vehicle Association Method of S230. Other examples of numerical approaches which can be used as the Vehicle Association Method can include kriging, Kalman filtering, supervised or unsupervised learning algorithms, including k-means clustering or random forests, wherein the number of clusters is specified or iteratively determined. In the case where the road occupancy mesh is set to be the granularity of a part of a full vehicle, such as when a model is comprised of individual axle or wheel entries, then rows for all wheels can be associated together as a vehicle or kept separate in order to analyze wheel behavior.

Once established by the Vehicle Association Method, a vehicle's location and property information developed from DFOS data is linked through time and space, and the Association sends an alert to assign these entries in the tabulated database a novel, unique property referred to here as the Vehicle ID. The Vehicle ID assignment provides a unique property which can then be used to sort, filter, or query the tabulated database for individual vehicles, and track them over time at S240.

In the Vehicle Tracking Method of S240, individual vehicles and the associated DFOS-derived vehicle location and property information are queried and analyzed for information about the vehicle's past, present, and/or future state. Many of the applications discussed here can be applied to autonomous vehicles or vehicles with human drivers.

Using the method outputs described above, it is possible to track vehicles at an individual level using the fully-associated DFOS-derived vehicle database. This would involve filtering the database using a particular Vehicle ID established from a known position and time, then sorting the results by time. If the Tracking Method is being implemented in real-time, new associations for the present Vehicle ID can be updated to the database and used.

It is possible to compute new vehicle properties in the present state of the database using simple geometry and calculus applied to the sorted Vehicle ID data, including, for example, vehicle speed, vehicle acceleration, vehicle distance from nearby vehicles, vehicle position within a lane, and vehicle distance to an upcoming intersection. This information can be used to develop an aggregated model of traffic flow or congestion or speed that would be constructed in a statistical sense from multiple individual vehicles and thus the precision will be better than other methods in existence today.

It is also possible to analyze a vehicle's historical state(s) using this database and potentially combined with a maximum likelihood or different optimization estimation technique. One example use case for this technology is to determine the historical record of an individual vehicle to determine if the vehicle exceeded the speed limit. Another example of this use case is to provide homicide and kidnapping case investigation teams (so-called Amber Alerts in California) historical vehicle movement information about suspected vehicles involved in the crime. Suspects' vehicles are commonly known at only one or only a few locations and times, but the vehicle's movements before or after this time and location are unknown. It is also possible to track hit-and-run vehicle suspects after they departed the scene of the crime. To summarize, using DFOS recordings and the vehicle database it is possible to fill in historical information, for example in a probabilistic sense.

It is also possible to forecast a vehicle's future state(s) using the fully-associated DFOS-derived vehicle database. For example, a Kalman filter or neural network or Bayesian estimator or similar can be implemented with the historical and present vehicle state information for a given particular Vehicle ID, and then the vehicle's most likely next position or multiple of positions can be estimated, and this estimate can be refined iteratively in a control loop. This use case has many applications, including, for example, sending alerts to vehicles when they are approaching intersections or other vehicles if speed is too high. In embodiments, multiple vehicle locations are analyzed to create situational awareness for human drivers or autonomous vehicles to aid in navigation and collision avoidance.

It is also possible to analyze a vehicle's data or a road location for behavioral patterns. In one case, a single vehicle or driver's behavior can be analyzed for its behavior. For example, if a vehicle was observed to be exceeding the speed limit for prolonged times, driving at anomalously low speeds, suddenly accelerating, swerving, or following vehicles with very limited space (i.e., tailgating), an alert can be sent indicating that the vehicle was driving recklessly and is a danger to other vehicles, and other vehicles in the area can be warned by text message. A model to detect this pattern may be implemented as a convolutional neural network trained on prior patterns of similarly dangerous behavior labeled from previous instances and then deployed to detect when the identified behavior is being displayed.

In another embodiment, a road location can be analyzed for common or uncommon behaviors, such as vehicles driving the wrong direction on a one way road can be detected. Upon detection of such behavior, the system may generate an alert that is routed to traffic authorities, and/or traffic signs that output a warning to passing drivers. In other embodiments, the above methods and systems detect vehicles on a controlled segment of road, such as a toll road or a reversible direction road, to confirm whether any vehicles are present and driving in a particular direction.

Further embodiments of the disclosed subject matter are as follows. According to a first further embodiment, there is provided a method of determining a force exerted by an object onto a surface under the object using at least one optical fiber located below or adjacent to the surface, the method including: measuring distributed fiber-optic sensing (DFOS) data arising from strain in the at least one optical fiber responsive to the force; determining at least one relationship between the measured DFOS data and the force and processing the measured DFOS data and the at least one relationship to determine the force. According to a second further embodiment, there is provided the method of the first further embodiment, wherein determining the force includes determining a force distribution including magnitude and location of the force, the method further including deriving object information of the object based on the force distribution. According to a third further embodiment, there is provided the method of the second further embodiment, wherein the object information includes at least one of a footprint area of the object and a mass distribution of the object. According to a fourth further embodiment, there is provided the method of any one of the second through third further embodiments, wherein the object information includes at least one of a velocity of the object, an acceleration of the object, a momentum of the object, a speed of the object, an identity of the object and a travelling direction of the object. According to a fifth further embodiment, there is provided the method of any one of the first through fourth further embodiments, wherein the at least one relationship between the measured DFOS data and the force is determined by training a machine learning network using at least one of DFOS data and the physical relationship between DFOS measurements and force distribution. According to a sixth further embodiment, there is provided the method of any one of the first through fourth further embodiments, wherein the at least one relationship between the measured DFOS data and the force corresponds to at least one transfer function of a medium between at least one location on the surface and at least one sensing segment on the at least one optical fiber. According to a seventh further embodiment, there is provided the method of the sixth further embodiment, wherein the at least one location on the surface includes multiple locations corresponding to a mesh or matrix of nodes on the surface. According to an eighth further embodiment, there is provided the method of the seventh further embodiment, wherein the DFOS data and the at least one transfer function are used to determine the force distribution at specific locations within the mesh of nodes over the at least one sensing segment on the at least one optical fiber. According to a ninth further embodiment, there is provided the method of the sixth further embodiment, wherein determining the force distribution includes using at least one statistical optimization method and inverting a matrix related to the at least one transfer function, wherein inverting the matrix related to the at least one transfer function is performed before performing DFOS. According to a tenth further embodiment, there is provided the method of the ninth further embodiment, wherein the at least one statistical optimization method is conducted in real-time while performing DFOS. According to an eleventh further embodiment, there is provided the method of any one of the sixth through tenth further embodiments, wherein determining the at least one transfer function of the medium between at least one location on the surface and at least one sensing segment on the at least one optical fiber is based on at least two of the material(s) of the medium, the geometry of the at least one optical fiber relative to the at least one location on the surface, and local geological information. According to a twelfth further embodiment, there is provided the method of any one of the sixth through eleventh further embodiments, the method further including selecting at least one gauge length of the at least one optical fiber for performing DFOS, the gauge length corresponding to the at least one segment on the at least one optical fiber. According to a thirteenth further embodiment, there is provided the method of any one of the first through twelfth further embodiments, wherein the object includes a vehicle. According to a fourteenth further embodiment, there is provided the method of the thirteenth further embodiment, wherein the object information includes at least one of a count of axles of the vehicle and occupancy of the vehicle. According to a fifteenth further embodiment, there is provided the method of any one of the first through fourteenth further embodiments, wherein the surface includes multiple lanes. According to a sixteenth further embodiment, there is provided the method of the fifteenth further embodiment, the method further including determining lane quantization of the multiple lanes.

According to a seventeenth further embodiment, there is provided a method of determining a force exerted by an object onto a surface under the object, the method comprising measuring DFOS data in an optical fiber located below or adjacent to the surface; and calculating the force based on the measured DFOS data. According to an eighteenth further embodiment, there is a provided the method of any of the preceding further embodiment wherein the measuring the DFOS data includes measuring strain. According to a nineteenth further embodiment, there is a provided the method of any of the preceding further embodiments wherein the measuring the DFOS data includes measuring ground motion. According to a twentieth further embodiment, there is a provided the method of any of the preceding further embodiments further comprising generating an alert in response to the calculating of the force. According to a twenty-first further embodiment, there is a provided the method of any of the preceding further embodiments further comprising determining a location of the object on the surface. According to a twenty-second further embodiment, there is a provided the method of any of the preceding further embodiments further comprising calculating a horizontal offset between the object and the optical fiber. According to a twenty-third further embodiment, there is a provided the method of any of the preceding further embodiments further comprising storing in a storage table the measured DFOS data. According to a twenty-fourth further embodiment, there is a provided the method of any of the preceding further embodiments further comprising storing in the storage table the calculated force.

According to a twenty-fifth further embodiment, there is a provided the method comprising measuring DFOS data in an optical fiber located substantially below or adjacent to the surface; calculating a force based on the measured DFOS data; and determining that the force is exerted by the objects on the surface. According to a twenty-sixth further embodiment, there is a provided the method of any of the preceding further embodiments wherein the DFOS data includes at least one of strain and ground motion. According to a twenty-seventh further embodiment, there is a provided the method of any of the preceding further embodiments further comprising estimating characteristics of the objects detected on the surface. According to a twenty-eighth further embodiment, there is a provided the method of any of the preceding further embodiments wherein the characteristics include at least one of the object's X position and the object's Y position. According to a twenty-ninth further embodiment, there is a provided the method of any of the preceding further embodiments wherein the surface includes at least one of a roadway, driveway, parking lot, garage floor, airport taxi ways and run ways, building or warehouse floor, trail, sidewalk, field, and an agricultural yard, the objects include a vehicle, and the characteristics include at least one of vehicle location and vehicle properties. According to a thirtieth further embodiment, there is a provided the method of any of the preceding further embodiments wherein the roadway includes multiple lanes, and the vehicle location indicates a position of a vehicle along the roadway and a lane position. According to a thirty-first further embodiment, there is a provided the method of any of the preceding further embodiments wherein the characteristics include vehicle properties. According to a thirty-second further embodiment, there is a provided the method of any of the preceding further embodiments wherein the vehicle properties include at least one of a footprint area of the vehicle, a count of axles of the vehicle, a mass of the vehicle, a velocity of the vehicle, an acceleration of the vehicle, a momentum of the vehicle, a mass distribution of the vehicle, occupancy of the vehicle, a speed of the vehicle, and a direction of travel of the vehicle. According to a thirty-third further embodiment, there is a provided the method of any of the preceding further embodiments wherein the vehicle is one of a passenger vehicle, motorcycle, scooter, light-truck/SUV, truck, heavy machinery, and 4-wheeled ATV. According to a thirty-fourth further embodiment, there is a provided the method of estimating vehicle information of one or more vehicles on a surface, the method comprising performing quantitative distributed fiber-optic sensing (DFOS) with one or more optical fibers buried along the surface to estimate the vehicle information of the one or more vehicles on the surface. According to a thirty-fifth further embodiment, there is a provided the method of any of the preceding further embodiments wherein the surface includes a road extending along a length and having a width, and the vehicle information includes individual vehicle positions along the length of the road. According to a thirty-sixth further embodiment, there is a provided the method of any of the preceding further embodiments wherein the vehicle information includes individual vehicle positions along the width of the road. According to a thirty-seventh further embodiment, there is a provided the method of any of the preceding further embodiments wherein the vehicle information includes a vehicle footprint area. According to a thirty-eight further embodiment, there is a provided the method of any of the preceding further embodiments wherein the vehicle information includes a count of axles of a vehicle. According to a thirty-ninth further embodiment, there is a provided the method of any of the preceding further embodiments wherein the vehicle information includes a mass of a vehicle. According to a fortieth further embodiment, there is a provided the method of any of the preceding further embodiments wherein the vehicle information includes a mass distribution of a vehicle. According to a forty-first further embodiment, there is a provided the method of any of the preceding further embodiments wherein the vehicle information includes occupancy of a vehicle. According to a forty-second further embodiment, there is a provided the method of any of the preceding further embodiments wherein the vehicle information includes a load of a vehicle. According to a forty-third further embodiment, there is a provided the method of any of the preceding further embodiments wherein the vehicle information includes at least one of a speed of a vehicle and a direction of travel of the vehicle.

According to a forty-fourth further embodiment, there is a provided a method of tracking individual vehicles traveling on a roadway, the method comprising performing distributed fiber-optic sensing (DFOS) with one or more optical fibers buried along the roadway to estimate vehicle information of the individual vehicles; and combining the estimated vehicle information to generate tracking information for each of the individual vehicles. According to a forty-fifth further embodiment, there is a provided the method of any of the preceding further embodiments wherein the generating of the tracking information includes calculating lane quantization. According to a forty-sixth further embodiment, there is a provided the method of any of the preceding further embodiments wherein the generating of the tracking information includes calculating a distance between two vehicles in the X direction. According to a forty-seventh further embodiment, there is a provided the method of any of the preceding further embodiments wherein the generating of the tracking information includes calculating a distance between two vehicles in the Y direction. According to a forty-eighth further embodiment, there is a provided the method of any of the preceding further embodiments, further comprising generating one or more alerts based on the generated tracking information. According to a forty-ninth further embodiment, there is a provided the method of any of the preceding further embodiments further comprising storing the one or more alerts in a storage device.

According to a fiftieth further embodiment, there is provided a method of selecting gauge length for performing DFOS, the method comprising identifying a length, in a direction substantially parallel to an optical fiber, of an object on a surface to be detected; estimating a weight of the object; calculating a dimension of an area of the surface that is deformed by the object based on a model of a first depth of material under the surface; and selecting the gauge length based on calculated dimension. According to a fifty-first further embodiment, there is a provided the method of any of the preceding further embodiments wherein the selecting the gauge length is further based on at least one of a pulse width of light injected into the optical fiber, a total length of the optical fiber, frequency of the light, and index of refraction of the optical fiber. According to a fifty-second further embodiment, there is a provided the method of any of the preceding further embodiments wherein the model includes a Boussinesq approximation of deformation of the surface.

According to a fifty-third further embodiment, there is a provided a system for performing DFOS configured to perform any of the methods according to any of the preceding further embodiments. According to a fifty-fourth further embodiment, there is provided a system for performing DFOS, the system comprising a device configured to emit a laser light into an optical cable and to receive light transmitted by the optical cable; and one or more processors configured to perform any of the methods according to the first through fifty-second further embodiments.

According to a fifty-fifth further embodiment, there is provided a system comprising a DFOS instrument including a light source, a modulator configured to modulate light generated by the light source, a photoreceiver, a controller configured to control at least the light source and the photoreceiver; and an optical fiber, wherein the DFOS instrument is optically coupled to the optical fiber. According to a fifty-sixth further embodiment, there is a provided the system of any of the preceding further embodiments of a system, wherein the light source is a laser. According to a fifty-seventh further embodiment, there is a provided the system of any of the preceding further embodiments of a system wherein the controller is further configured to execute a method of selecting gauge length for performing DFOS, including identifying a length, in a direction substantially parallel to an optical fiber, of an object on a surface to be detected; estimating a weight of the object; calculating a dimension of an area of the surface that is deformed by the object based on a model of a first depth of material under the surface; and selecting the gauge length based on calculated dimension. According to a fifty-eighth further embodiment, there is a provided the system of any of the preceding further embodiments of a system wherein the controller is further configured to execute a method of tracking individual vehicles traveling on a roadway, the method including performing distributed fiber-optic sensing (DFOS) with one or more optical fibers buried along the roadway to estimate vehicle information of the individual vehicles; and combining the estimated vehicle information to generate tracking information for each of the individual vehicles. According to a fifty-ninth further embodiment, there is a provided the system of any of the preceding further embodiments of a system wherein the controller is further configured to execute a method of estimating vehicle information of one or more vehicles on a surface, the method including performing quantitative distributed fiber-optic sensing (DFOS) with one or more optical fibers buried along the surface to estimate the vehicle information of the one or more vehicles on the surface. According to a sixtieth further embodiment, there is a provided the system of any of the preceding further embodiments of a system wherein the controller is further configured to execute a method of detecting objects on a surface, the method including measuring DFOS data in an optical fiber located substantially below or adjacent to the surface; calculating a force based on the measured DFOS data; and determining that the force is exerted by the objects on the surface. According to a sixty-first further embodiment, there is a provided the system of any of the preceding further embodiments of a system wherein the controller is further configured to execute a method of determining a force exerted by an object onto a surface under the object, the method including measuring DFOS data in an optical fiber located below or adjacent to the surface; and calculating the force based on the measured DFOS data.

According to a sixty-second further embodiment, there is provided a DFOS instrument, including a light source; a modulator configured to modulate light generated by the light source; a photoreceiver; a controller configured to control at least the light source and the photoreceiver, wherein the controller is configured to perform any of the methods of the further first through fifty-second embodiments.

According to another further embodiment, there is provided a method of determining a force exerted by an object onto a surface under the object using at least one optical fiber located below or adjacent to the surface. The method includes determining at least one transfer function of a medium between at least one location on the surface and at least one sensing segment on the at least one optical fiber; measuring distributed fiber-optic sensing (DFOS) data arising from strain in the at least one optical fiber responsive to the force; and processing the measured DFOS data and the at least one transfer function to determine the force. According to variations of this embodiment, the determining the force includes determining a force distribution including magnitude and location of the force and the method further includes deriving object information of the object based on the force distribution. According to further variations, the object information includes at least one of a footprint area of the object and a mass distribution of the object. According to further variations, the object information includes at least one of a velocity of the object, an acceleration of the object, a momentum of the object, a speed of the object and a travelling direction of the object. According to further variations, the at least one location on the surface includes multiple locations corresponding to a mesh or matrix of nodes on the surface. According to further variations, the DFOS data and the at least one transfer function are used to determine the force distribution at specific locations within the mesh of nodes over the at least one sensing segment on the at least one optical fiber. According to further variations, the determining the force distribution includes using at least one statistical optimization method. According to further variations, the at least one statistical optimization method is conducted in real-time while performing DFOS. According to further variation of any of the preceding variations, the method further includes inverting a matrix related to the at least one transfer function. According to further variations, the inverting the matrix related to the at least one transfer function is performed before performing DFOS. According to further variations, the determining the at least one transfer function of the medium between at least one location on the surface and at least on sensing segment on the at least one optical fiber is based on at least two of the material(s) of the medium, geometry of the at least one optical fiber relative to the at least one location on the surface, and local geological information. According to further variation of any of the preceding variations, the method further includes selecting at least one gauge length of the at least one optical fiber for performing DFOS, the gauge length corresponding to the at least one segment on the at least one optical fiber. According to further variations, the object includes a vehicle. According to further variations, the object information includes at least one of a count of axles of the vehicle and occupancy of the vehicle. According to further variations, the surface includes multiple lanes. According to further variation of any of the preceding variations, the method further includes determining lane quantization of the multiple lanes.

It is, thus, apparent that there are provided, in accordance with the present disclosure, distributed fiber-optic sensing systems, devices, and methods. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A method of determining a force exerted by an object onto a surface under the object using at least one optical fiber located below or adjacent to the surface, the method including:

measuring distributed fiber-optic sensing (DFOS) data arising from strain in the at least one optical fiber responsive to the force;

determining at least one relationship between the measured DFOS data and the force, wherein the at least one relationship corresponds to at least one transfer function of a medium between at least one location on the surface and at least one sensing segment on the at least one optical fiber; and processing the measured DFOS data and the at least one relationship to determine a force distribution including magnitude and location of the force.

2. The method of claim 1, further including deriving object information of the object based on the force distribution.

3. The method of claim 2, wherein the object information includes at least one of a footprint area of the object and a mass distribution of the object.

4. The method of claim 2, wherein the object information includes at least one of a velocity of the object, an acceleration of the object, a momentum of the object, a speed of the object, an identity of the object and a travelling direction of the object.

5. The method of claim 1, wherein the at least one relationship between the measured DFOS data and the force is determined by training a machine learning network using at least one of the DFOS data and a physical relationship between DFOS measurements and force distribution.

6. The method of claim 1, wherein the at least one location on the surface includes multiple locations corresponding to a mesh or matrix of nodes on the surface.

7. The method of claim 6, wherein the DFOS data and the at least one transfer function are used to determine the force distribution at specific locations within the mesh of nodes over the at least one sensing segment on the at least one optical fiber.

8. The method of claim 1, wherein determining the force distribution includes using at least one statistical optimization method and inverting a matrix related to the at least one transfer function, wherein inverting the matrix related to the at least one transfer function is performed before performing DFOS.

9. The method of claim 8, wherein the at least one statistical optimization method is conducted in real-time while performing DFOS.

10. The method of claim 1, wherein determining the at least one transfer function of the medium between at least one location on the surface and at least one sensing segment on the at least one optical fiber is based on at least two of material of the medium, geometry of the at least one optical fiber relative to the at least one location on the surface, and local geological information.

11. The method of claim 1, further including selecting at least one gauge length of the at least one optical fiber for performing DFOS, the gauge length corresponding to the at least one sensing segment on the at least one optical fiber.

12. The method of claim 1, wherein the object includes a vehicle.

13. The method of claim 12, wherein object information of the object includes at least one of a count of axles of the vehicle and occupancy of the vehicle.

14. The method of claim 1, wherein the surface includes multiple lanes.

15. The method of claim 14, further including determining lane quantization of the multiple lanes.

16. A method of determining a force exerted by an object onto a surface under the object, the method comprising:

measuring DFOS data arising from strain in an optical fiber located below or adjacent to the surface; and calculating a force magnitude at one or more locations on the surface based on the measured DFOS data and at least one transfer function of a medium between at least one location on the surface and at least one sensing segment on the optical fiber.

17. The method according to claim 16, further comprising determining at least one relationship between the DFOS data and the force magnitude wherein the relationship corresponds to the at least one transfer function of the medium between the at least one location on the surface and the at least one sensing segment of the optical fiber.

18. The method according to claim 16, wherein the measuring the DFOS data includes measuring ground motion.

19. The method according to claim 16, further comprising:

generating an alert in response to the calculating of the force.

* * * * *